United States Patent [19]

Mzik

[11] Patent Number: 4,825,952

[45] Date of Patent: May 2, 1989

[54] FRACTURING PROCESS FOR LOW PERMEABILITY RESERVOIRS EMPLOYING A COMPATIBLE HYDROCARBON-LIQUID CARBON DIOXIDE MIXTURE

[75] Inventor: Joseph Mzik, Calgary, Canada

[73] Assignee: Dwight N. Loree, Calgary, Alberta, Canada

[21] Appl. No.: 234,594

[22] Filed: Aug. 22, 1988

[30] Foreign Application Priority Data

Nov. 13, 1987 [CA] Canada ................................. 551,804

[51] Int. Cl.$^4$ ...................... E21B 43/26; E21B 43/267
[52] U.S. Cl. .................................. 166/308; 252/8.551
[58] Field of Search ............... 166/308, 307, 271, 281, 166/282, 259; 252/8.551

[56] References Cited

U.S. PATENT DOCUMENTS

| | | | |
|---|---|---|---|
| 3,108,636 | 10/1963 | Peterson | 166/308 |
| 3,368,627 | 2/1968 | Hurst et al. | 166/42 |
| 3,396,107 | 8/1968 | Hill | 166/308 X |
| 3,664,422 | 5/1972 | Bullen | 166/308 X |
| 3,842,910 | 10/1974 | Zingg et al. | 166/308 |
| 3,846,310 | 11/1974 | Blackwell et al. | 252/8.551 X |
| 4,374,545 | 2/1983 | Bullen et al. | 166/280 |
| 4,519,455 | 5/1985 | Holtmyer et al. | 166/308 X |
| 4,701,270 | 10/1987 | Bullen et al. | 166/308 X |

*Primary Examiner*—Stephen J. Novosad

[57] ABSTRACT

A method is described for fracturing a subterranean formation penetrated by a wellbore. A fracturing fluid in the form of a mixture of liquid carbon dioxide and a liquid hydrocarbon component of specific characteristics is injected down the wellbore under pressure to cause fracturing. The hydrocarbon component contains at least 70 wt. % of $C_5$–$C_{14}$ constituents and at least 8 wt. % aromatics and has an average molecular mass of less than 200, a pour point of less than $-40°$ C. and a density of from 0.77 to 0.85 g/ml at 15° C. This hydrocarbon component provides a higher viscosity than the liquid carbon dioxide at lower temperatures and is also an excellent solvent, simplifying clean-up. The novel fracturing fluid may also contain the usual proppants.

6 Claims, No Drawings

FRACTURING PROCESS FOR LOW PERMEABILITY RESERVOIRS EMPLOYING A COMPATIBLE HYDROCARBON-LIQUID CARBON DIOXIDE MIXTURE

BACKGROUND OF THE INVENTION

This invention relates to compositions for use in fracturing underground formations such as gas wells, particularly the fracturing of low permeability formations using such compositions.

The fracturing process involves the injecting of a treating fluid down to the wellbore and into the productive formation at a sufficient rate and pressure so that the formation rock fractures from the induced stresses. A proppant added into the fluid prevents closure of the fracture when hydraulic pressures are released, thereby leaving a conductive flow channel from the wellbore deep into the rock matrix.

For several years liquid carbon dioxide has been added to fracturing fluids to assist in post-treatment clean up. It was applied with oil or water based treating fluids at various ratios. Higher concentrations of liquid carbon dioxide in the fracturing fluid have been proven beneficial, leading to a reduction in the volume of treating fluids. The latest development in the fracturing process uses highly energized liquid carbon dioxide as the sole proppant carrier. The application of pure liquid carbon dioxide eliminates most of the formation damage normally associated with convention fracturing fluids and enables a very rapid clean up and evaluation of the well following the stimulation. However, when pure liquid carbon dioxide is applied and a sufficient fracture width not produced, a significant decline in productivity can be observed within several months after the stimulation.

Density and viscosity are the most important characteristics of the fracturing fluid. Both density and viscosity affect the carrying capacity of the fluid for sand, while viscosity is primarily responsible for the final fracture shape and profile. A wide range of additives are used to enhance the rheological and chemical properties of the oil, water or alcohol base treating fluids. Liquid carbon dioxide has a very low viscosity and its physical, chemical and thermodynamic properties over wide range of temperatures occurring during the fracturing processes limit the choice of additives considerably.

Several concepts were considered for the thickening of liquid carbon dioxide. For fracturing purposes an ideal situation would have the viscosity of thickened carbon dioxide decrease at bottom hole conditions without leaving solid or liquid residue in the formation. One way to achieve this was to have a novel composition using the concept of copolymerization of liquid carbon dioxide and propylene oxide as disclosed in U.S. Pat. No. 4,374,545. However, this system requires precise preparation, timing and handling of chemicals.

It is the object of the present invention to overcome the disadvantages of the prior art and provide a simpler and more effective fracturing process utilizing the conventional fracturing equipment now in use.

SUMMARY OF THE INVENTION

It has been observed that the viscosity of petroleum is increased more rapidly with decreasing temperature than any other suitable polymeric solution. Thus, petroleum could be useful in the fracturing process if a hydrocarbon mixture could be found having required properties and which could be miscible with liquid carbon dioxide.

According to the present invention, it has been found that a hydrocarbon-liquid carbon dioxide mixture, without addition of thickening agents, is capable of providing a higher viscosity than liquid carbon dioxide and ensuring a greater fracture width. It is also capable of acting as a better solvent than liquid carbon dioxide and simplifies clean up. The hydrocarbon component of the mixture has the following characteristics:

(a) an average molecular mass of less than 200;
(b) a content of at least 70 wt. % of $C_5$–$C_{14}$ constituents;
(c) a content of at least 8 wt. % of aromatics;
(d) a pour point of less than $-40°$ C.
(e) a density of from 0.77 to 0.85 g/ml. at 15° C.

Preferably the hydrocarbon component has an average molecular mass of less than 150 and a density of 0.78 to 0.8 g/ml at 15° C. The aliphatic hydrocarbon mixture having the above properties is miscible with liquid $CO_2$ without presence of aromatics.

The hydrocarbon mixture comprises of aliphatic hydrocarbon components obtained by blending of petroleum products of light and intermediate distillates, such as light and heavy naphtha, kerosine, light gas oil, etc., with the aromatics such as ethylbenzene, methyl-, dimethyl-, and trimethylbenzene; or a mixture of the above. Although 1, 2-dimethylbenzene is the most suitable aromatic compound, the multicomponent mixtures of aromatics are preferred. Various gas condensates are a good source of aromatics and their increased content within the hydrocarbon component is often desirable.

The liquid carbon dioxide and hydrocarbon component can be combined in widely varying proportions, but will usually be in the proportions of about 95 to 15 vol. % liquid carbon dioxide to 5 to 85 vol. % hydrocarbon component. They are preferably in the proportions of about 60 to 40 vol. %. liquid carbon dioxide to about 40 to 60 vol. % hydrocarbon component. The liquid carbon dioxide and hydrocarbon components are preferably combined on the surface and injected as a mixture down the wellbore, but they may be combined within the formation. The fracturing fluid of this invention is very simple and safe to use in the field and can be injected using conventional fracturing equipment. For instance, it may be mixed with any of the usual propping agents, such as sands.

In any given application of the process in practice, the rate of injection and the initial temperature of the liquid carbon dioxide must be determined in each instance by the depth and temperature of the well. All of the necessary information is available to the petroleum engineer from well completion data and from standard engineering books and tables.

This invention is best understood by reference to the following example, which is offered only as an illustrative embodiment of my invention, and is not intended to be limitative or restrictive thereof.

EXAMPLE

A gas well located at Trilogy et al Saxon 16-10-61-25 W5, Alberta having been completed with a 5½ inch casing to a depth of about 8,860 feet was treated by the process of the instant invention. For the treatment there was used liquid $CO_2$, 40/60 mesh silica sand proppant and a hydrocarbon distillate having the following characteristics:

(a) The average molecular mass of the hydrocarbon composition was lower than 120.

(b) The hydrocarbon contained over 80 percent of $C_5$-$C_{14}$ constituents.

(c) The hydrocarbon mixture contained over 30 percent of aromatics.

(d) The pour point of the hydrocarbon mixture was lower than $-50°$ C.

(e) The hydrocarbon density was 0.800 g/ml at 15° C.

The liquid $CO_2$ was admixed with the hydrocarbon component in a proportion of about 50 vol. % liquid $CO_2$ and about 50 vol. % hydrocarbon component. The resulting mixture was blended with proppant sand at a concentration of 1-12 pounds per gallon of liquid $CO_2$-hydrocarbon mixture and the resulting slurry was injected down the well and forced back into the formation at a pressure of about 6,000 psi which fractured the formation. By this technique, 42,500 pounds of 20/40 mesh sand was successfully placed in the zone.

Two hours after completion of the frac, the well started flowing back and 36 hours later, 100% of liquid (load fluid) was recovered. The well tested at 300 MCF.

I claim:

1. The method of treating a subterranean formation penetrated by a wellbore which comprises injecting into the formation a fluid mixture comprising (1) liquid carbon dioxide and (2) a liquid hydrocarbon component containing at least 70 wt. % of $C_5$-$C_{14}$ constituents and at least 8 wt. % aromatics and has an average molecular mass of less than 200, a pour point of less than $-40°$ C. and a density of from 0.77 to 0.85 g/ml at 15° C., said fluid mixture being injected at a pressure sufficient to cause fracturing, and thereafter releasing the pressure on the injected fluid mixture whereby the fracturing fluid becomes readily flowable and flows back out of the formation and up the wellbore.

2. The method according to claim 1 wherein the liquid carbon dioxide and liquid hydrocarbon component are mixed on surface and the fluid mixture is injected down the wellbore.

3. The method according to claim 1 wherein the liquid carbon dioxide and liquid hydrocarbon component are mixed within the formation.

4. The method according to claim 1 wherein the fluid mixture contains about 95-15 vol. % liquid carbon dioxide and about 5-85 vol. % hydrocarbon component.

5. The method according to claim 1 wherein the fluid mixture contains about 60-40 vol. % liquid carbon dioxide and about 40-60 vol. % hydrocarbon component.

6. The method according to claim 4 wherein the fluid mixture also contains proppants.

* * * * *